(12) United States Patent
Bathija et al.

(10) Patent No.: US 9,092,426 B1
(45) Date of Patent: Jul. 28, 2015

(54) ZERO-COPY DIRECT MEMORY ACCESS (DMA) NETWORK-ATTACHED STORAGE (NAS) FILE SYSTEM BLOCK WRITING

(75) Inventors: Pravin M. Bathija, San Jose, CA (US); Haluk Aytac, Lincoln, CA (US)

(73) Assignee: Applied Micro Circuts Corporation, Sunnyvale, CA (US)

( * ) Notice: Subject to any disclaimer, the term of this patent is extended or adjusted under 35 U.S.C. 154(b) by 539 days.

(21) Appl. No.: 12/983,391

(22) Filed: Jan. 3, 2011

(51) Int. Cl.
*G06F 13/28* (2006.01)
*G06F 12/10* (2006.01)
*G06F 12/02* (2006.01)

(52) U.S. Cl.
CPC ............ *G06F 13/28* (2013.01); *G06F 12/1081* (2013.01); *G06F 12/0292* (2013.01)

(58) Field of Classification Search
CPC .. G06F 13/28; G06F 12/0292; G06F 12/1081
USPC .......................................................... 710/26
See application file for complete search history.

(56) References Cited

U.S. PATENT DOCUMENTS

| | | | |
|---|---|---|---|
| 5,931,925 A * | 8/1999 | McNabb et al. ............... 710/52 |
| 6,665,747 B1 * | 12/2003 | Nazari ............................ 710/22 |
| 7,152,069 B1 | 12/2006 | Santry et al. |
| 7,249,227 B1 | 7/2007 | Pittman |
| 7,330,862 B1 | 2/2008 | Srinivasan et al. |
| 7,403,974 B1 | 7/2008 | Harris |
| 7,676,607 B2 | 3/2010 | Jung et al. |
| 2004/0037319 A1 | 2/2004 | Pandya |
| 2004/0042483 A1 | 3/2004 | Elzur et al. |
| 2005/0273649 A1 * | 12/2005 | Jung et al. ......................... 714/5 |
| 2006/0294234 A1 | 12/2006 | Bakke et al. |
| 2007/0208821 A1 | 9/2007 | Pittman |
| 2008/0002578 A1 * | 1/2008 | Coffman et al. .............. 370/230 |
| 2008/0126599 A1 * | 5/2008 | Wei et al. ......................... 710/22 |
| 2009/0024823 A1 * | 1/2009 | Ko et al. ......................... 711/202 |
| 2009/0073884 A1 | 3/2009 | Kodama et al. |
| 2009/0328073 A1 | 12/2009 | Tripathi |
| 2010/0070677 A1 | 3/2010 | Thakkar |
| 2010/0211947 A1 | 8/2010 | Van Riel |
| 2010/0228934 A1 | 9/2010 | Chandrasekaran et al. |
| 2010/0235465 A1 | 9/2010 | Thorpe et al. |
| 2010/0250626 A1 | 9/2010 | Takaoka et al. |

\* cited by examiner

*Primary Examiner* — Idriss N Alrobaye
*Assistant Examiner* — Brooke Taylor
(74) *Attorney, Agent, or Firm* — Amin, Turocy & Watson, LLP

(57) ABSTRACT

A method is provided for a network-attached storage (NAS) server to directly write data to a disk or block device within a storage subsystem. A NAS server Ethernet interface receives a file, and writes the file data into kernel space as PDU segments. A TCP/IP stack maps the file data in kernel space RAM as sequentially ordered segments. The NAS/CIFS server application sends a call specifying file storage data. A zero-copy DMA application receives the call, maps a file offset to a Logical Block Address (LBA) in the block device, and requests that the block device DMA application transfer the file data. Without rewriting the file data in the system RAM, the block driver DMA application transfers the file data, in units of file system blocks, directly from kernel space RAM to the block device, with each file system block written in a single write operation.

18 Claims, 12 Drawing Sheets

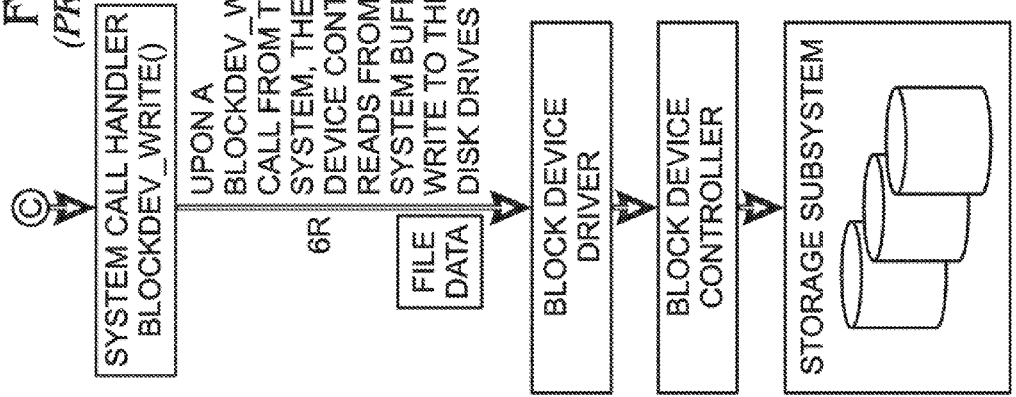
Fig. 1B
(PRIOR ART)
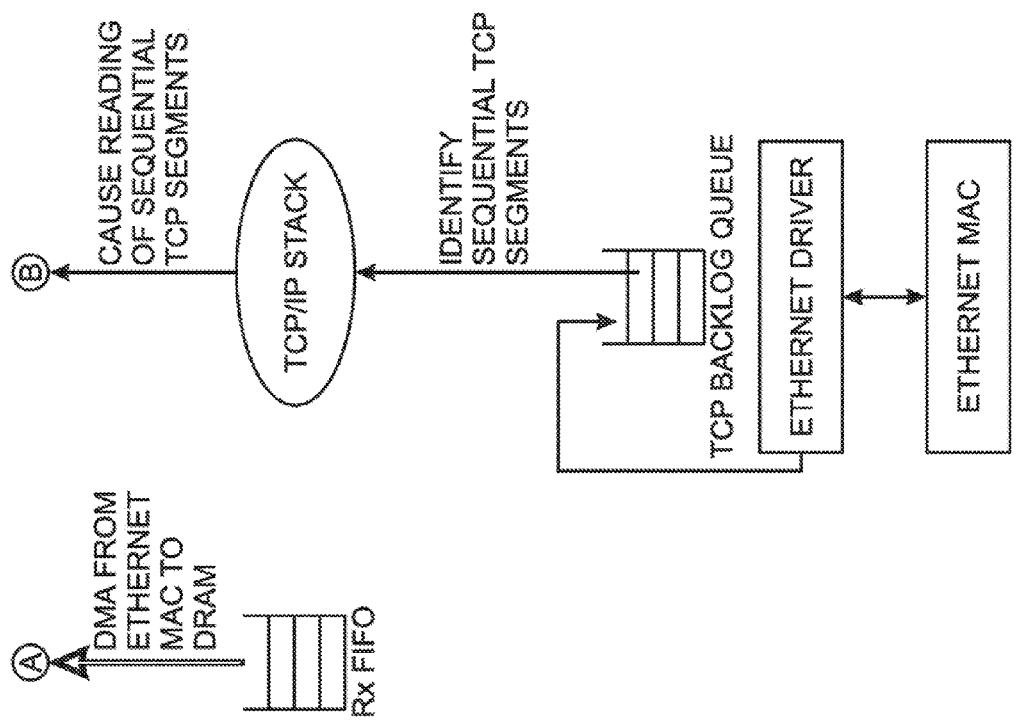

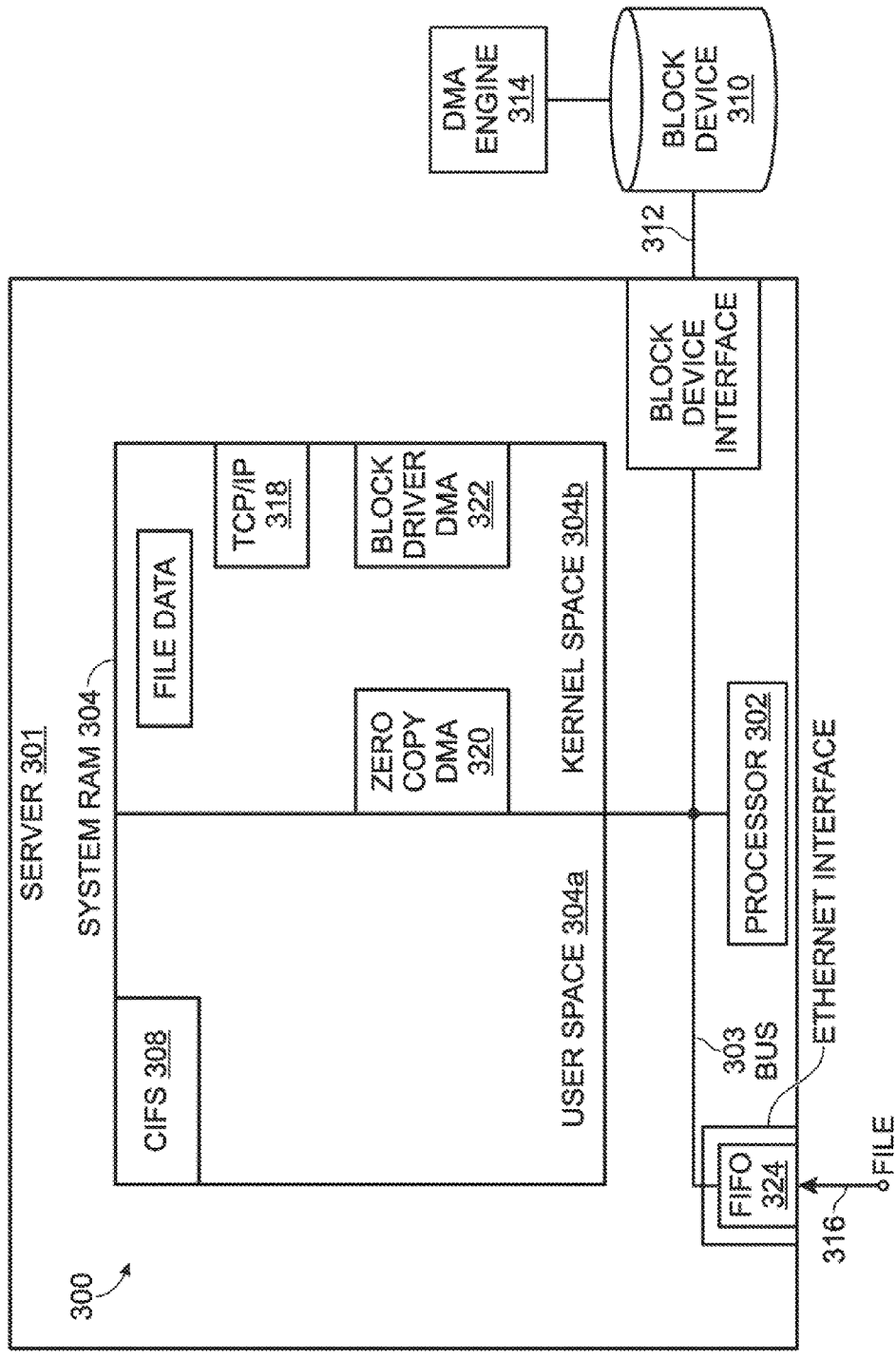

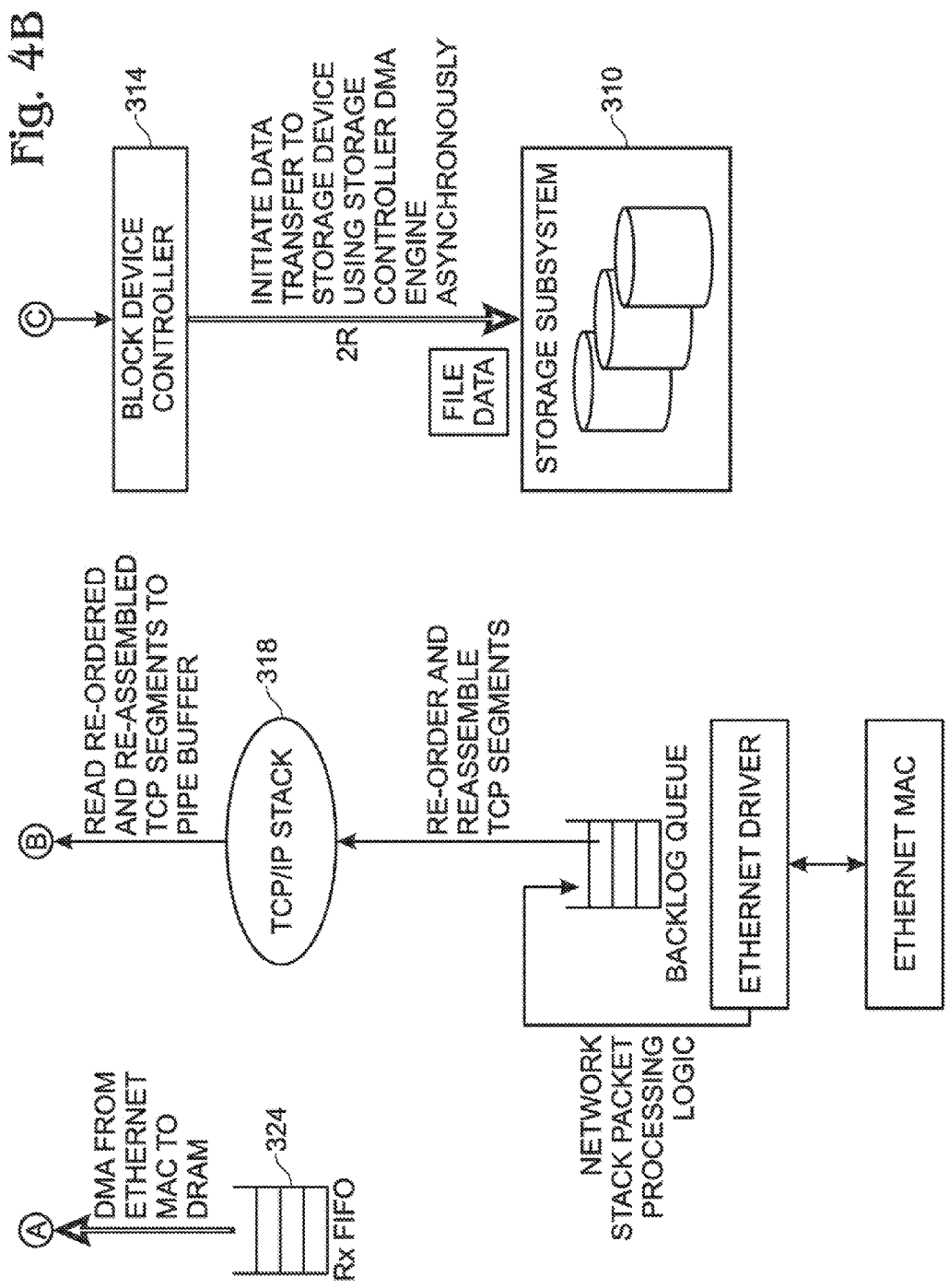

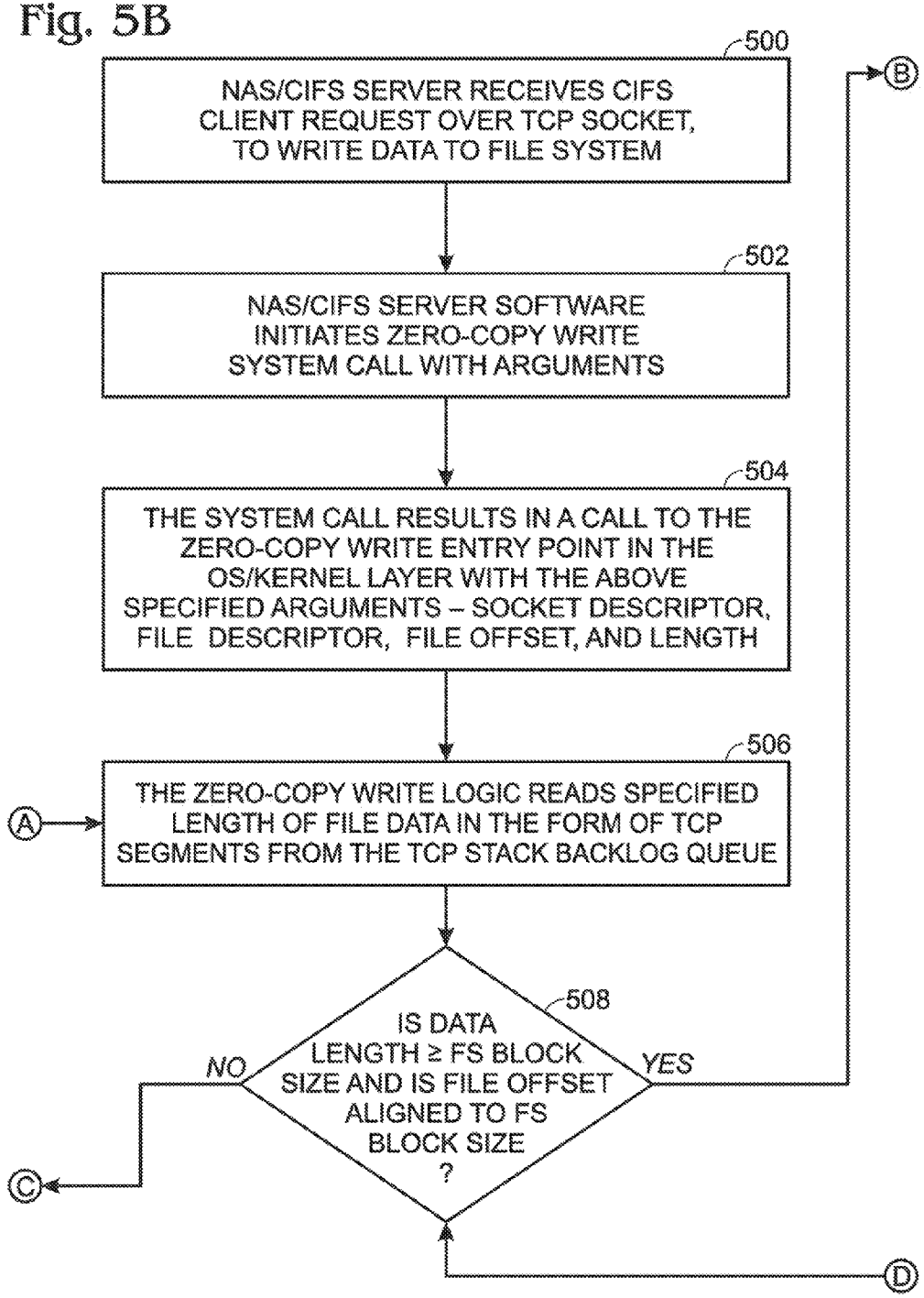

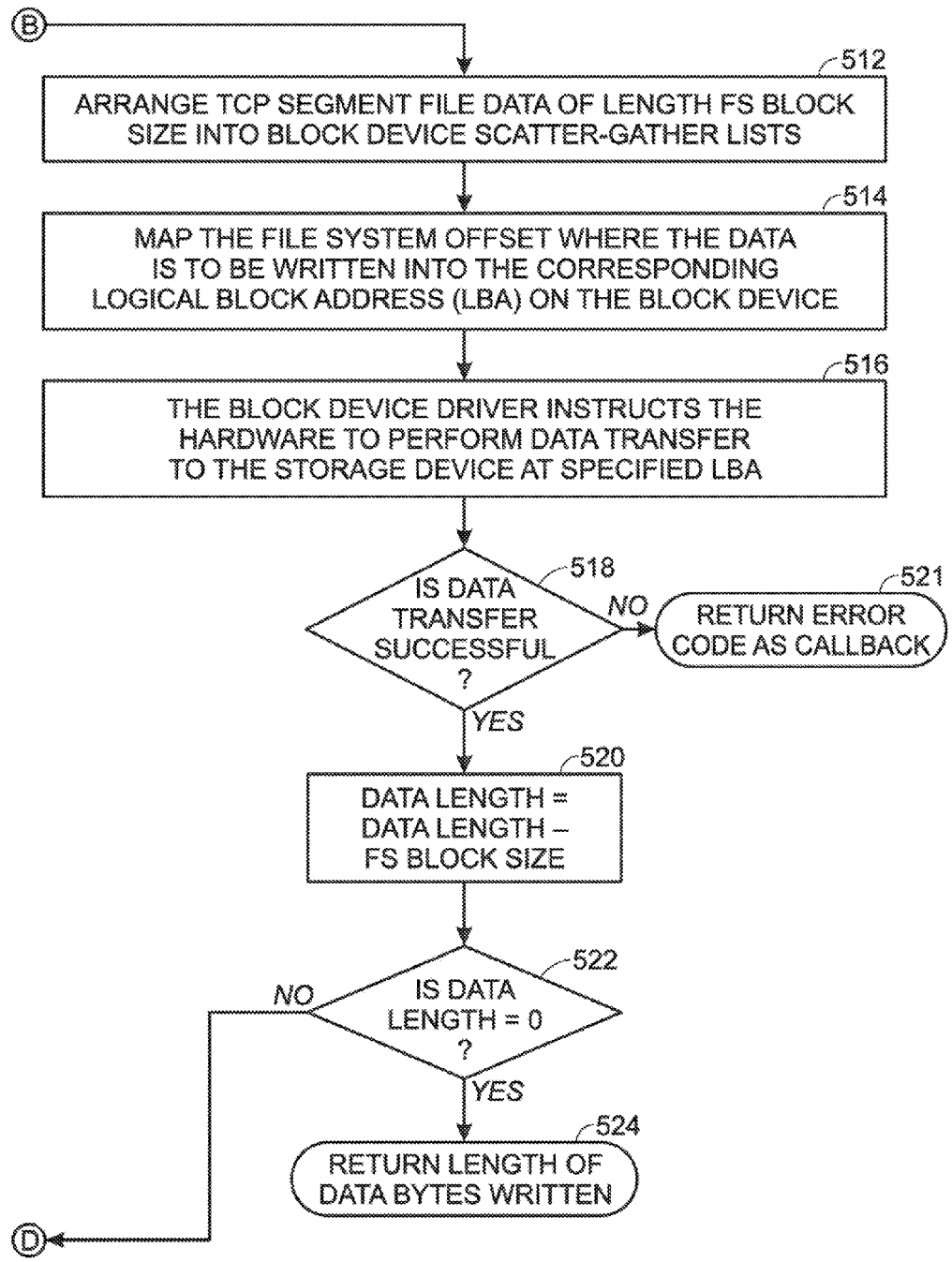

ZERO-COPY DIRECT MEMORY ACCESS (DMA) NETWORK-ATTACHED STORAGE (NAS) FILE SYSTEM BLOCK WRITING

BACKGROUND OF THE INVENTION

1. Field of the Invention

This invention generally relates to digital data storage and, more particularly, to a system and method for directly copying file data into disk on NAS, without creating an intermediate copy of the data in kernel memory.

2. Description of the Related Art

OS: Operating System.

FS: File System

TCP/IP: Transmission Control Protocol/Internet Protocol—The most widely used protocol for data networking.

NAS: Network Attached Storage: A system comprising hard disk drives, specialized software running the CIFS protocol. This system exports data-storage over a network to which multiple clients can share and store their data.

CIFS: Common Internet File System: The commonly used protocol for sharing data storage in NAS.

SMB/Samba: Server Message Block Protocol: A popular implementation of the CIFS protocol used in the data storage industry.

CIFS Server: The software module that runs on a NAS subsystem and exports File System Shares to be accessed by CIFS clients over a TCP/IP Network.

DRAM: Dynamic Random Access memory.

DMA: Direct Memory Access. Data transfer using a separate block without CPU intervention.

As noted in Wikipedia, a conventional computer operating system usually segregates virtual memory into kernel space and user space. Kernel space is strictly reserved for running the kernel, kernel extensions, and most device drivers. In contrast, user space is the memory area where all user mode applications work and this memory can be swapped out when necessary. Each user space process or application normally runs in its own virtual memory space, and, unless explicitly requested, cannot access the memory of other processes. This is the basis for memory protection in today's mainstream operating systems, and a building block for privilege separation.

In computing, the kernel is the central component of most computer operating systems; it is a bridge between applications and the actual data processing done at the hardware level. The kernel's responsibilities include managing the system's resources (the communication between hardware and software components). Usually as a basic component of an operating system, a kernel can provide the lowest-level abstraction layer for the resources (especially processors and I/O devices) that application software must control to perform its function. It typically makes these facilities available to application processes through inter-process communication mechanisms and system calls.

The kernel is also understood to be the part of the operating system that is mandatory and common to all other software applications. The existence of a kernel is a natural consequence of designing a computer system as a series of abstraction layers, each relying on the functions of layers beneath it. The kernel, from this viewpoint, is simply the name given to the lowest level of abstraction that is implemented in software. A kernel does not typically execute directly, but only in response to external events (e.g., via system calls used by applications to request services from the kernel, or via interrupts used by the hardware to notify the kernel of events).

The kernel's primary purpose is to manage the computer's resources and allow other programs to run and use these resources. Typically, the resources consist of a Central Processing Unit (CPU) or processor, which is responsible for running or executing programs. The kernel takes responsibility for deciding at any time which of the many running programs should be allocated to the processor or processors. Another resource managed by the kernel is the computer's memory. Memory is used to store both program instructions and data. The kernel is responsible for deciding which memory each process can use. Another managed resource are Input/Output (I/O) devices present in the computer, such as keyboard, mouse, disk drives, printers, displays, and NAS. The kernel allocates requests from applications to perform I/O to an appropriate device (or subsection of a device, in the case of files on a disk or windows on a display) and provides convenient methods for using the device (typically abstracted to the point where the application does not need to know implementation details of the device).

A main task of a kernel is to allow the execution of applications and support them with features such as hardware abstractions. A process or application defines which memory portions the application can access. To run an application, a kernel typically sets up an address space for the application, loads the file containing the application's code into memory, sets up a stack for the program, and branches to a given location inside the program, thus starting its execution.

The kernel has full access to the system's memory and must allow processes to safely access this memory as they require it. Often the first step in doing this is virtual addressing, usually achieved by paging and/or segmentation. Virtual addressing allows the kernel to make a given physical address appear to be another address, the virtual address. Virtual address spaces may be different for different processes; the memory that one application accesses at a particular (virtual) address may be different memory from what another application accesses at the same address. This allows every application to behave as if it is the only one (apart from the kernel) running and thus prevents applications from crashing each other.

In many systems, an application's virtual address may refer to data which is not currently in memory. The layer of indirection provided by virtual addressing allows the operating system to use other data stores, like a hard drive, to store what would otherwise have to remain in main memory (RAM). As a result, operating systems can allow programs to use more memory than the system has physically available. When a program needs data which is not currently in RAM, the CPU signals to the kernel that this has happened, and the kernel responds by writing the contents of an inactive memory block to disk (if necessary) and replacing it with the data requested by the program. The application can then be resumed from the point where it was stopped. This scheme is generally known as demand paging.

Virtual addressing also allows creation of virtual partitions of memory in two disjointed areas, one being reserved for the kernel (kernel space) and the other for the applications (user space). The applications are not permitted by the processor to address kernel memory, thus preventing an application from damaging the running kernel. This fundamental partition of memory space has contributed much to the current design of actual general-purpose kernels and is almost universal.

To perform useful functions, applications need to access peripherals connected to the computer, which are controlled by the kernel through device drivers. As device management is a very OS-specific topic, these drivers are handled differently by each kind of kernel design, but in every case, the kernel has to provide the drivers access to peripherals through some port or memory location.

To actually perform useful work, an application must be able to access the services provided by the kernel. This is implemented differently by each kernel, but most provide a C library or an API, which in turn invokes the related kernel functions. Some examples of invocation include a software-simulated interrupt, a call gate, a special system-call instruction, or a memory-based queue.

In computer networking, an Internet socket or network socket is an endpoint of a bidirectional inter-process communication flow across an Internet Protocol-based computer network, such as the Internet. The term Internet sockets is also used as a name for an application programming interface (API) for the TCP/IP protocol stack, usually provided by the operating system. Internet sockets constitute a mechanism for delivering incoming data packets to the appropriate application process or thread, based on a combination of local and remote IP addresses and port numbers. Each socket is mapped by the operating system to a communicating application process or thread.

A socket address is the combination of an IP address (the location of the computer) and a port (which is mapped to the application program process) into a single identity, much like one end of a telephone connection is the combination of a phone number and a particular extension.

An Internet socket is characterized by a unique combination of the following:

a local socket address: Local IP address and port number;

a remote socket address: Only for established TCP sockets, which is necessary since a TCP server may serve several clients concurrently. The server creates one socket for each client, and these sockets share the same local socket address;

a transport protocol (e.g., TCP, UDP, raw IP, or others.

Within the operating system and the application that created a socket, the socket is referred to by a unique integer number called socket identifier or socket number. The operating system forwards the payload of incoming IP packets to the corresponding application by extracting the socket address information from the IP and transport protocol headers and stripping the headers from the application data.

A file system is a method of storing and organizing computer files and their data. Essentially, it organizes these files into a database for the storage, organization, manipulation, and retrieval by the computer's operating system. Most file systems make use of an underlying data storage device that offers access to an array of fixed-size physical sectors, generally a power of 2 in size (512 bytes or 1, 2, or 4 KB are most common). The file system is responsible for organizing these sectors into files and directories, and keeping track of which sectors belong to which file and which are not being used. Most file systems address data in fixed-sized units called "clusters" or "blocks" which contain a certain number of disk sectors (usually 1-128). This is the smallest amount of disk space that can be allocated to hold a file. The file system is typically an integral part of any modern operating system.

FIGS. 1A and 1B are a schematic diagram of a file system writing data into a NAS (prior art). Conventional file systems write into NAS using 6 DRAM accesses, which reduces performance and increases system resource utilization. The data, in the form of Ethernet frames, enters the NAS subsystem through the Ethernet port and is written to DRAM, which results in a memory write (1W). A NAS/samba server listens on a TCP socket port to receive data (from a client) that is to be written to the file system on the NAS subsystem. After this; the TCP stack performs re-assembly and re-ordering of the data into TCP segments. These TCP segments are copied to DRAM socket buffers in user space in the context of the NAS/samba server application. This involves a read access and a write access of DRAM (2R and 3W). The samba/NAS server then performs a file system write of this data at the specified offset within the file denoted by the file descriptor. This involves a read from the user buffers and a write to the kernel file system buffers in DRAM (4R and 5W). Finally, the data from file system buffers in DRAM is asynchronously written to file system on disk. This involves a read of the file system buffers in DRAM (6R).

FIGS. 2A and 2B are a schematic diagram of a conventional zero-copy NAS write mechanism (prior art). In the system of FIGS. 2A and 2B the number of DRAM accesses is reduced to 4, which significantly improves performance and at the same time reduces the amount of system resources required to perform the file system write. As data, in the form of Ethernet frames, enters the NAS subsystem through the Ethernet port, it is written to DRAM, which results in a memory (1W). After this, the TCP stack performs re-assembly and re-ordering of the data into TCP segments. The NAS zero-copy logic copies data from multiple TCP segments to the file system buffers in DRAM at the specified offset within the file denoted by the file descriptor. This involves a read from TCP segments in DRAM and a write to file system blocks in DRAM (2R and 3W). Finally, the data from the file system buffers in DRAM is asynchronously written to file system on disk (i.e. block device or NAS subsystem). This involves a read of the file system buffers in DRAM (4R).

The NAS file method of FIGS. 1A and 1B involves 6 accesses to DRAM, while the method shown in FIGS. 2A and 2B involves 4 DRAM accesses. In both of these methods NAS file system write performance is degraded due to multiple accesses of DRAM.

It would be advantageous if a NAS file system could be made to operate with a reduced number of DRAM accesses.

SUMMARY OF THE INVENTION

Accordingly, a method is provided for a network-attached storage (NAS) server to directly write data to a disk or block device with a storage subsystem. The method is enabled with the use of a NAS server processor, a system random access memory (RAM) with a user space and a kernel space, a Transmission Control Protocol/Internet Protocol (TCP/IP) stack application, a zero-copy direct memory access (DMA) application, a block driver DMA application, a NAS/Common Internet File System (CIFS) server application, an Ethernet interface, a block device interface, a block device, and a DMA engine.

The Ethernet interface receives a file, with a request to the NAS/CIFS server application that the file be written into the block device, and writes the file data into system RAM kernel space as a plurality of decapsulated Protocol Data Units (PDUs). The TCP/IP stack maps (logically reorganizes) the file data in system RAM kernel space as sequentially ordered TCP segments. The NAS/CIFS server application sends a call specifying file storage data. The zero-copy DMA application receives the call, maps a file offset to a Logical Block Address (LBA) in the block device, and requests that the block device DMA application transfer the file data. Without rewriting the file data in system RAM kernel space, the block driver DMA application transfers the file data, in units of file system blocks, directly from system RAM kernel space to the block device, with each file system block written in a single write operation.

Additional details of the above-described method and a NAS server with a direct writing system are provided below.

BRIEF DESCRIPTION OF THE DRAWINGS

FIGS. 1A and 1B are a schematic diagram of a file system writing data into a NAS (prior art).

FIG. 3 is a schematic block diagram of a network-attached storage (NAS) server with a system for directly writing data to a disk or block device within a storage subsystem.

FIGS. 4A and 4B are a schematic diagram depicting the system of FIG. 3 showing the interplay between the various software blocks needed to perform zero-copy direct DMA NAS file system writes.

FIGS. 5A through 5C are flowcharts associated with the system of FIGS. 3, 4A, and 4B, depicting the algorithmic flow of the software that performs zero-copy direct DMA NAS file system writes.

DETAILED DESCRIPTION

Figure 1A:
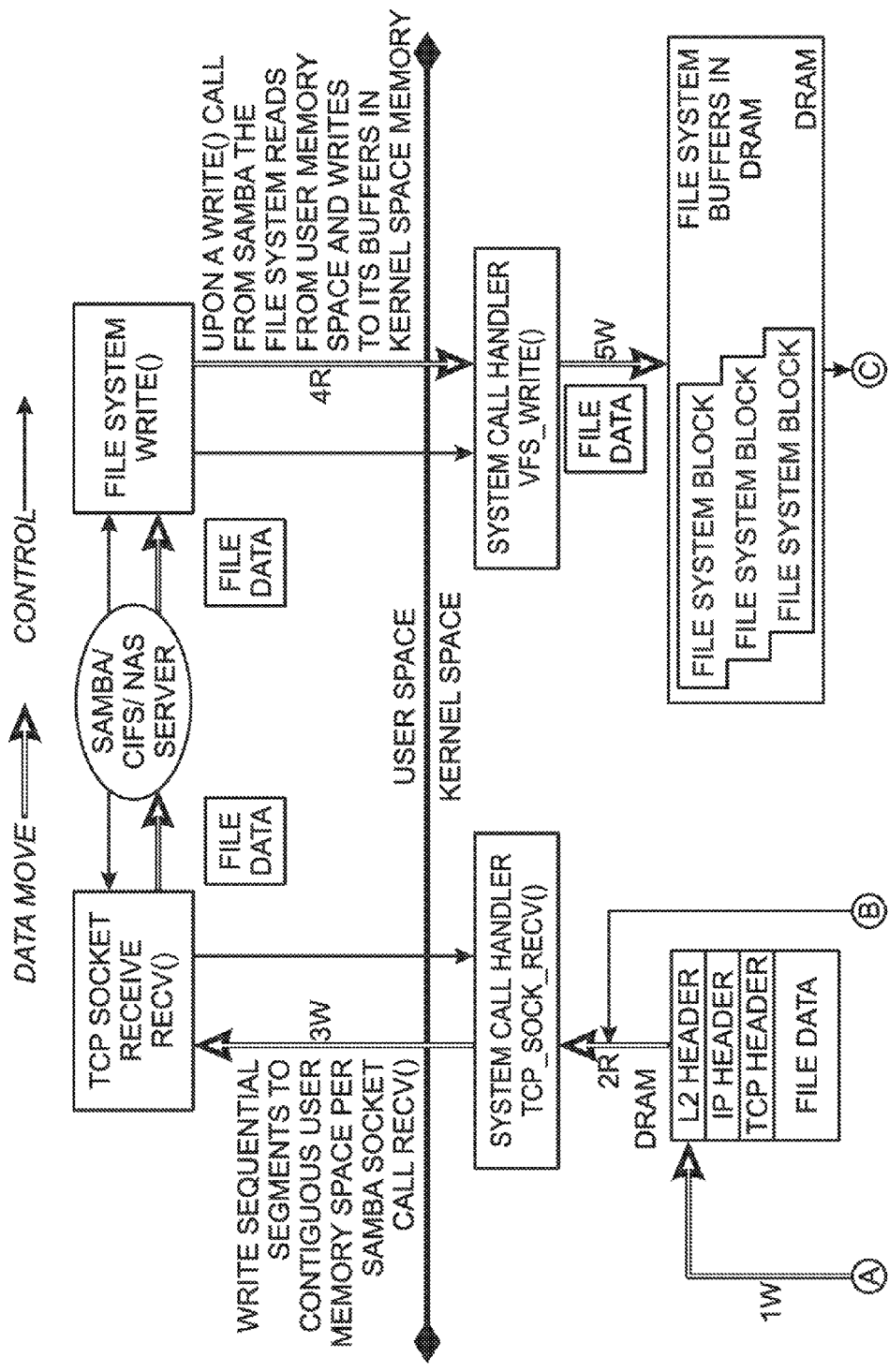
Figure 2A:
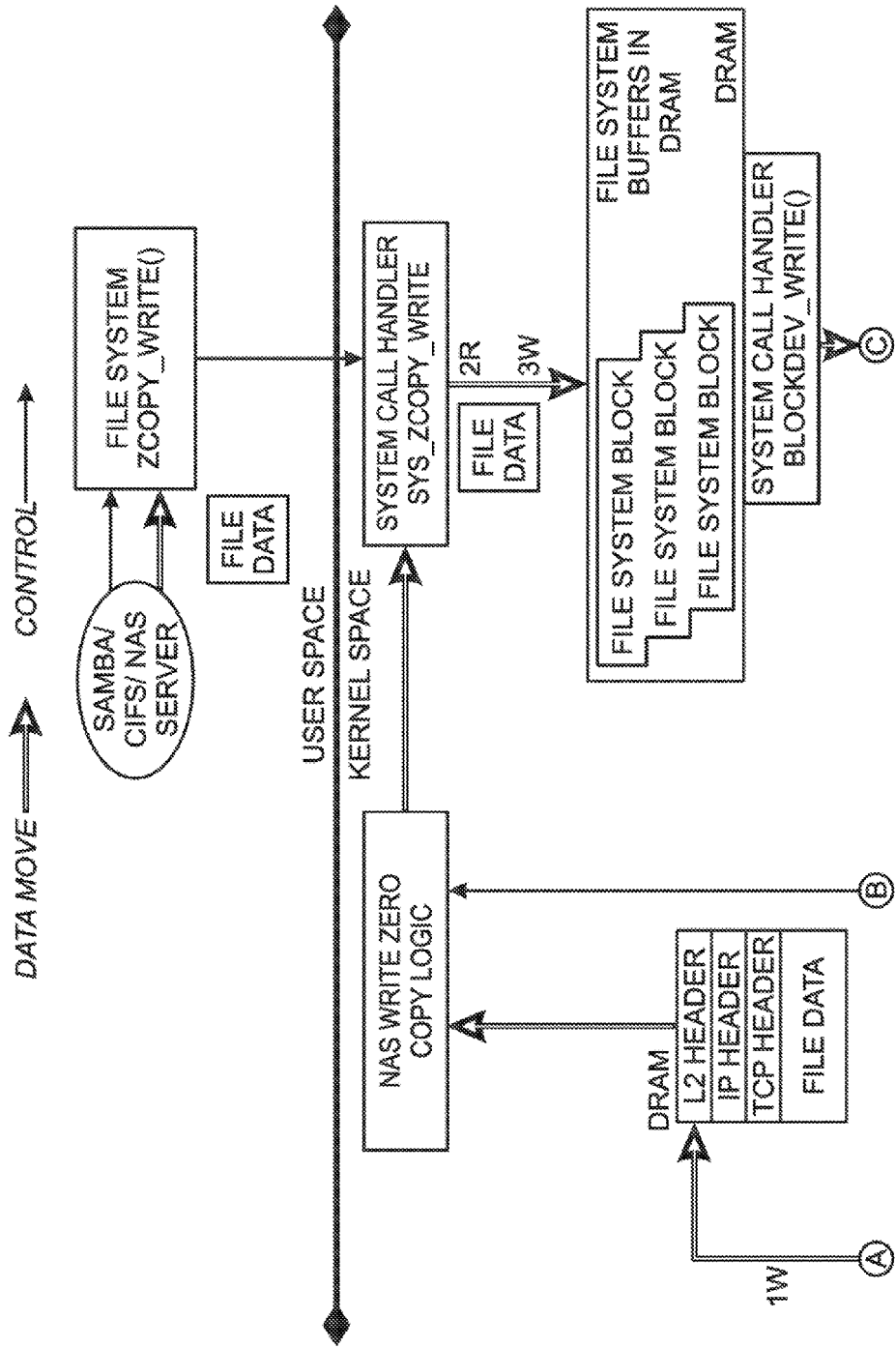
FIGS. 2A and 2B are a schematic diagram of a conventional zero-copy NAS write mechanism (prior art).
Figure 2B:
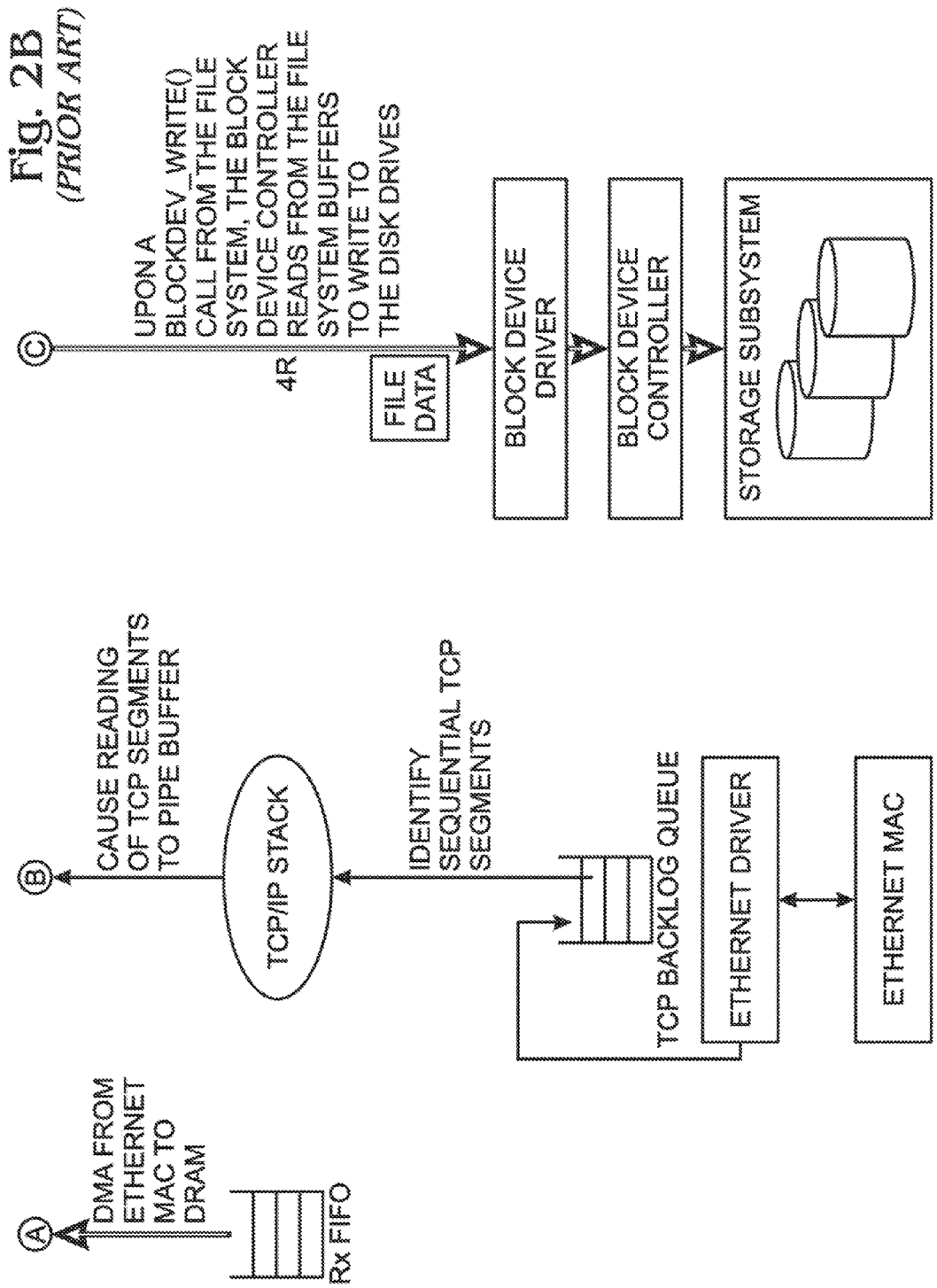

FIG. 3 is a schematic block diagram of a network-attached storage (NAS) server 301 with a system for directly writing data to a disk or block device within a storage subsystem. The system 300 comprises a processor 302, a system random access memory (RAM) 304 with a user space 304a and a kernel space 304b. A Double Data Rate (DDR) memory and dynamic RAM (DRAM) are some examples of system memory or system RAM. A NAS/Common Internet File System (CIFS) server application 308 is embedded in the user space 304a as a sequence of software instructions executed by the processor 302. A block device or disk 310 has an interface on line 312 and an embedded direct memory access (DMA) engine 314.

As used in this application, the terms "application," "process," "system," and the like may be intended to refer to an automated computing system entity, such as hardware, firmware, a combination of hardware and software, software, software stored on a computer-readable medium, or software in execution. For example, an application may be, but is not limited to being, a process running on a processor, a processor, an object, an executable, a thread of execution, a program, and/or a computer. One or more applications can reside within a process and/or thread of execution and an application may be localized on one computer and/or distributed between two or more computers. In addition, these applications can execute from various computer readable media having various data structures stored thereon. The applications may communicate by way of local and/or remote processes such as in accordance with a signal having one or more data packets (e.g., data from one component interacting with another component in a local system, distributed system, and/or across a network such as the Internet with other systems by way of the signal).

The server 301 typically employs a computer system with a bus 303 or other communication mechanism for communicating information, and a processor 302 coupled to the bus 303 for processing information. The server 301 may also include a main memory, such as a RAM 304 or other dynamic storage device, coupled to the bus 303 for storing information and instructions to be executed by processor 302. These memories may also be referred to as a computer-readable medium. The execution of the sequences of instructions contained in a computer-readable medium may cause a processor to perform some of the steps associated with NAS storage. Alternately, these functions, or some of these functions may be performed in hardware. The practical implementation of such a computer system would be well known to one with skill in the art. Although not explicitly shown, the block device would typically be enabled as a computer system.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The memory may include a main memory, a read only memory, and mass storage devices such as various disk drives, tape drives, etc. The main memory typically includes DRAM and high-speed cache memory. In operation, the main memory stores at least portions of instructions and data for execution by the processor 302. The memory may also comprise a mass storage device (not shown), for storing data and instructions for use by processor 302. The mass storage may also include one or more drives for various portable media, such as a floppy disk, a compact disc read only memory (CD-ROM), or an integrated circuit non-volatile memory adapter (i.e. PC-MCIA adapter) to input and output data and code to and from the server.

The network interface on line 316 is for data communications via a network. The interface may be a modem, an Ethernet card, or any other appropriate data communications device. The physical communication links may be optical, wired, or wireless. Other interfaces (not shown) may also include appropriate input/output ports for user interface interconnection. Block device interface 312 connects the server 301 to the block device 310. Serial advanced technology attachment (SATA), small computer system interface (SCSI), statistical analysis system (SAS), and ATA some examples of block device interfaces.

To begin the process, an Ethernet interface on line 316 receives a file (data file), with a request to the NAS server 301 that the file be written into the block device 310. The Ethernet interface 316 writes the file data as a plurality of decapsulated Protocol Data Units (PDUs) into the system RAM kernel space 304b. A Transmission Control Protocol/Internet Protocol (TCP/IP) stack application 318 is embedded in the kernel space 304b as a sequence of software instructions executed by the processor 302. The TCP/IP stack application 318 maps (logically reorganizes) the file data into the kernel space RAM 304b as sequentially ordered TCP segments. The NAS/CIFS application 308 sends a call specifying file storage data.

A zero-copy DMA application 320 is embedded in the kernel space 304b as a sequence of software instructions executed by the processor. The zero-copy DMA application 320 receives the call. Typically, the NAS/CIFS server application 308 sends the call specifying information such as a TCP socket descriptor from which the file, in the form of TCP segments, is to be read, the file system descriptor to which the file is to be written, the file offset, and number of bytes in the file, file system flags, or combinations of the above-listed information. The zero-copy DMA application 320, maps a file offset to a Logical Block Address (LBA) in the block device 310, and requests that block device 310 transfer the file data.

A block driver DMA application 322 is embedded in the kernel space 304b as a sequence of software instructions executed by the processor 302. The block driver DMA application 322 transfers the file data in units of file system blocks, directly from kernel space RAM 304b to the block device 310, without rewriting the file data in system RAM kernel space. Each file system block is written in a single write operation.

In another aspect, the Ethernet interface 316 includes a first-in first-out (FIFO) memory 324. The Ethernet interface on line 316 receives the file data as a plurality of PDUs, circulates the PDUs through the FIFO 324, and supplies decapsulated PDUs. Each PDU is comprised of a TCP segment and control information. That is, the TCP segment is the payload portion of PDU after the Ethernet protocol header has been removed. After the FIFO 324 is drained into system RAM kernel space, the TCP/IP stack application reorganizes the file data in system RAM 304b as the plurality of sequential TCP segments.

In one aspect, the TCP/IP stack application 318 uses a first set of pointers to arrange the file data as TCP segments in sequential order, and the zero-copy DMA application 320 uses a second set of pointers to map the file offset to destination LBAs. The zero-copy DMA application 318 creates a scatter-gather list of source addresses in system RAM 304b for contiguous TCP segments, and corresponding block addresses in the block device 310.

When file data is received in the form of TCP packets/segments, this data is stored in disparate memory locations, i.e. it is "scattered". However, the file data is supposed to be contiguous, and must have contiguous destinations in the block/disk device in which it is to be written, which means it will be "gathered". For instance, "data1" is at memory location 3-to-7, "data2" is at memory location 10-to-13", and "data3" is at location 16-to-18. The data is to be transferred to one contiguous disk LBA location starting at 20. A scatter-gather list is created in the following manner:

data1 of length 5→source address 3→destination address 20;
data2 of length 4→source address 10→destination address 25; and,
data3 of length 3→source address 16→destination address 29. The above elements are arranged in the form of linked list pattern supported by the block device DMA controller hardware.

As file data, in the form of PDUs, is circulated through the Ethernet FIFO 324 it is automatically written to system RAM kernel space 304b in a circular linked list format, without any software intervention. This data is decapsulated by Ethernet hardware before it is written to this circular linked list. Thus, the file data is stored in the form of PDUs. Pointers to linked list elements are sent to the TCP/IP stack application 318 where it is re-ordered, re-assembled, and arranged based on relative sequence numbers, resulting in TCP segment file data which can be read from a socket. Note: the above-mentioned re-ordering and re-assembling process is conducted without actually moving the data in kernel memory.

After this, a zero copy system call accesses this TCP segment file data in the form of pointers by reading these pointers from the TCP socket descriptor it has received as an argument. It maps the destination file offset to LBAs and writes the data with the help of storage controller hardware.

In one aspect, the zero-copy DMA application 320 determines if the amount of file data in the plurality of TCP segments is less than a file system block. If the amount of file data is a file system block (or an integer number of file system blocks), the zero-copy DMA application 320 maps the file offset to the LBA in the block device 310, as explained above. If the amount of data is less than a file system block, the zero-copy DMA application 320 reads a first block into system RAM kernel space 304b from the block device 310, modifies the first block in system RAM kernel space by adding the file data, and writes the modified first block into the block device 310 from system RAM kernel space 304b. This less-than-a-full-block process resembles a conventional read/modify/write process.

Likewise, the zero-copy DMA application 320 may determine if the amount of file data in the plurality of TCP segments is an integer number of file system blocks. If the amount of file data includes an integer number of file system blocks, the zero-copy DMA application 320 maps the file offset to the LBA in the block device 310, as described above. If the amount of file data includes less than an integer number of file system blocks (e.g., 0.5 or 1.3 file system blocks), the zero-copy DMA application 320 reads a first block into system RAM kernel space 304b from the block device 310, modifies the first block in system RAM kernel space by adding the non-integer block file data, and writes the modified first block into the block device from system RAM kernel space 304b. This non-integer process resembles a conventional read/modify/write process.

In a related variation, the zero-copy DMA application 320 determines if a destination file system offset address is aligned with an integer number of file system blocks. If the destination file system offset address is aligned with an integer number of file system blocks, the zero-copy DMA application maps the file offset to the LBA in the block device, as described above. If the destination file system offset address is not aligned with an integer number of file system blocks, the zero-copy DMA application 320 reads at least a first block into system RAM kernel space 304b from the block device 310. If x file system blocks are not aligned with the destination file system offset address, then x blocks are read into system RAM kernel space 304b from the block device 310. The zero-copy DMA application modifies the x blocks read into system RAM kernel space by adding the file data, and the modified blocks are written into the block device 310 from system RAM kernel space. Again, this process resembles a conventional read/modify/write process.

Functional Description

Figure 4A:
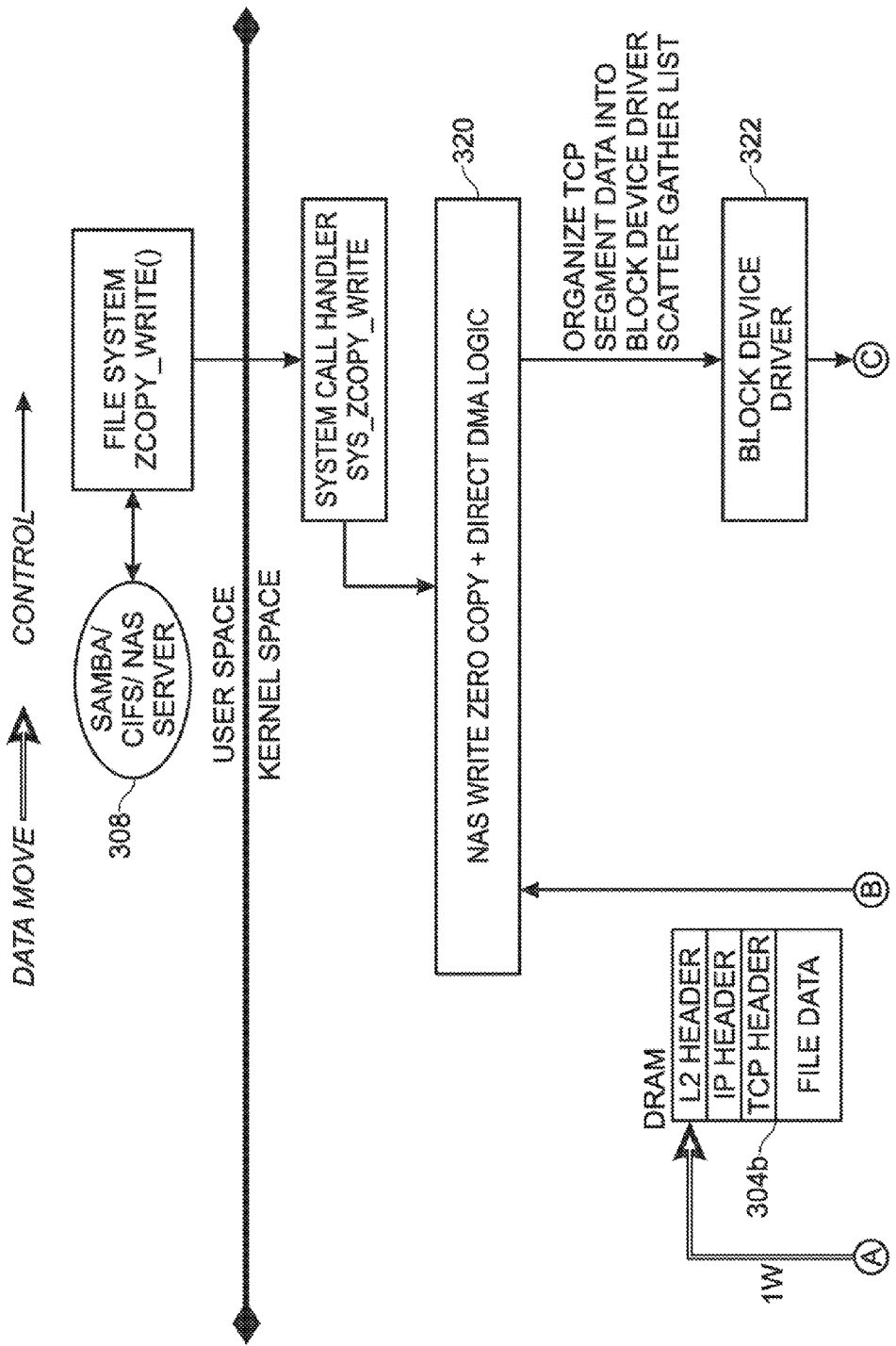

FIGS. 4A and 4B are a schematic diagram depicting the system of FIG. 3 showing the interplay between the various software blocks needed to perform zero-copy direct DMA NAS file system writes. As data in the form of Ethernet frames enters the NAS subsystem through the Ethernet port, it is written to DRAM 304b, which results in a memory write (1W). After this, the TCP stack 318 performs re-assembly and re-ordering of the data into TCP segments.

The NAS zero-copy direct DMA logic 320 organizes the TCP segments, meant to be written to the file system, into a block device drive scatter-gather list. The block device driver 322 initiates transfer of the data from the scatter gather list to the block device 310 at the specified file system offset or LBA, using the DMA engine 314 on the block device controller.

Figure 5A:
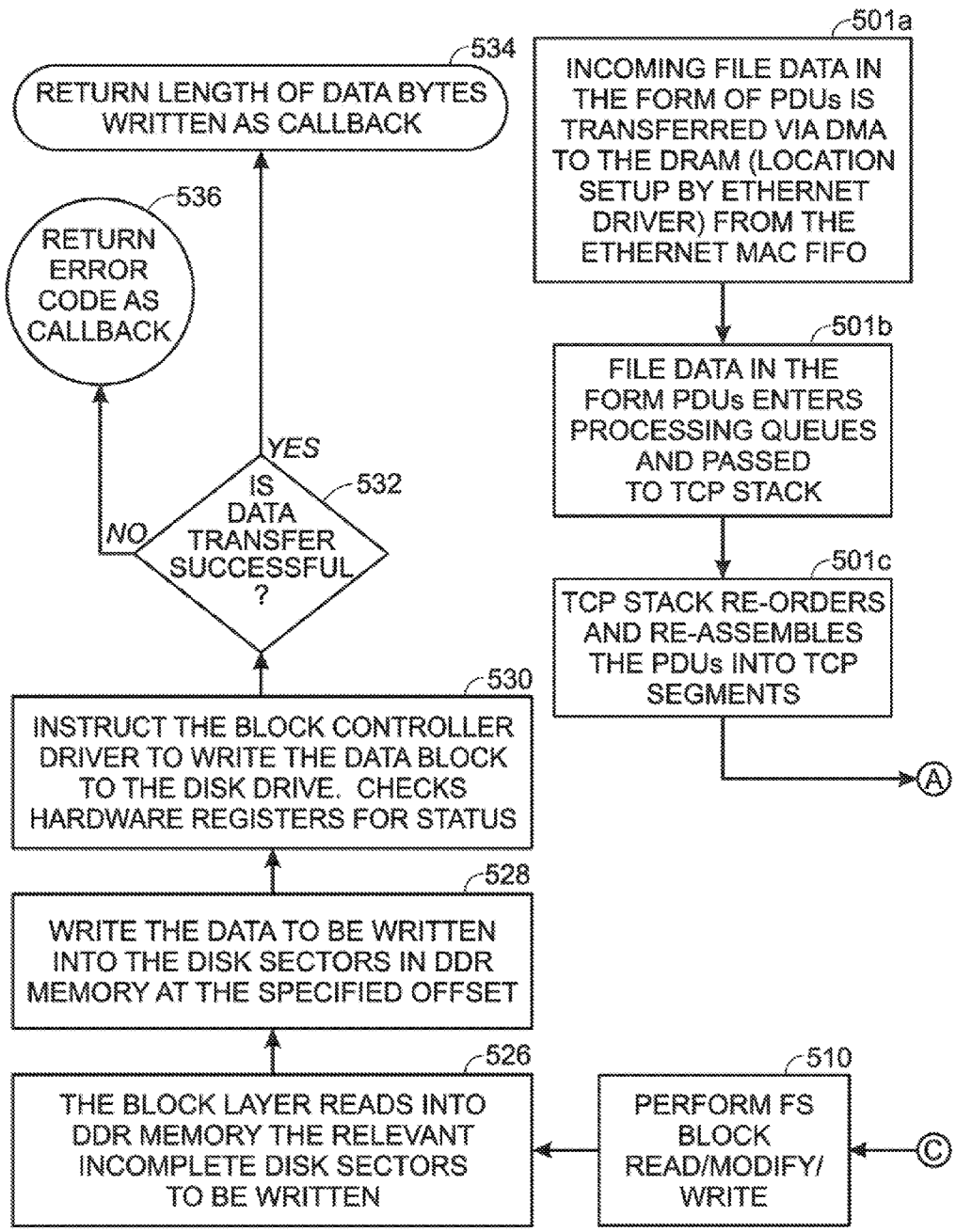

FIGS. 5A through 5C are flowcharts associated with the system of FIGS. 3, 4A and 4B, depicting the algorithmic flow of the software that performs zero-copy direct DMA NAS file system writes. In Step 500 the NAS/CIFS server receives a request over the TCP socket interface from a remote NAS client, to write data to the file system. The NAS client also sends the TCP file data to be written to the file system in the form of Ethernet PDUs (Step 501a): These PDUs are transferred via DMA engine to the NAS/CIFS subsystem DRAM (system memory) and undergo TCP/IP protocol processing (Step 501b). The TCP layer performs re-ordering and re-assembly of the data (Step 501c). That is, the NAS client sends a CIFS write command to the NAS server along with the data to be written. This command and data are received by the NAS/CIFS/samba server on the same socket. The "write command" is transferred from kernel space to user space while the data packets continue to remain in kernel space.

On receiving the NAS write request from the client (Step 502), the NAS subsystem software initiates the zero-copy write system call with the arguments—the TCP socket descriptor that is the source of the data, file system descriptor that is the data destination, the file system offset at which the data will be written on the file system, and the number of data bytes to be written. In Step 504 the system call results in a call to the corresponding zero-copy mirror function in the OS layer with the same arguments provided—TCP socket descriptor that is the source of the data, the file system descriptor that is the data destination, the file system offset at which the data will be written on the file system, and the number of data bytes to be written. Now that the file data has been obtained from the queue in TCP stack, the data can be written to the file system using the file system block write method.

In Step 506 the zero-copy direct DMA logic iterates through the file data to be read from the TCP socket descriptor, in chunks (units) of a file system block size. The file system being a block level entity by its very nature can only be read and written to in terms of blocks. Hence, any software module that interfaces with the file system APIs, or implements them, should access the file system data in file system block size units.

If the total amount of TCP segment data destined for the file system is less than the file system block size (Step 508), or if the file system offset to be written to is not file system block size aligned, or if data is not an integral multiple file system blocks, the write is performed to the file system by calling the file system block read/modify/write interface (Step 510).

If the total amount of TCP segment data destined for the file system is greater than the file system block size the, the writes for the TCP data are performed in file system block size units (Step 512). The zero-copy direct DMA logic initiates a block write of the TCP segment by organizing the data, in file system block size units, into the block device driver layer scatter gather list. In addition, it registers a callback function which will be executed on completion of the write to the file system for that block. The block write operation for the TCP data is then queued to be written at the LBA address translated from the file system offset.

The block device is addressed in terms of logical blocks. In order to write data to the block device, the file system offset has to be mapped to the corresponding Logical Block Address on the block storage device, Step 514. This mapping is performed before the scatter-gather list comprising TCP data is handed off to the block device driver for writing to the file system.

On receiving the block write request from the zero-copy direct DMA logic, the block device driver requests transfer of the data in the scatter-gather list at the specified LBA, by accessing the hardware registers on the block device controller, Step 516. The data transfer from the DRAM (as pointed by the scatter-gather list) is performed by a DMA engine on the block device controller hardware. The block device driver may be interrupted on completion of the write transaction at which point it checks the block device controller hardware registers for status information.

If the write transaction completed successfully (Step 518), the call back function registered by the upper layer is executed and the number of bytes transferred is returned. If the write transaction fails, an error code is returned in Step 520. The write operation continues in Step 520. If less than a full block of data is available (Step 522), the process returns to Step 508. Otherwise, the process ends at Step 524.

In Step 526 a block is read into DDR memory from the block device. In Step 528, the data is written into the block in DDR memory. In Step 530 the modified block is written back into the block device. If the data transfer was successful (Step 532), the number of written bits is returned as callback (Step 534). Otherwise, Step 536 returns an error message. In summary, the file system can only be accessed in terms of blocks. So, in order to write data which is less than file system block size, the file system write logic software reads the block from the file system (to which the data is supposed to be written) into DRAM. The software then writes the new TCP file system data at the specified offset in the block in DRAM. The block driver then instructs the block controller hardware to initiate transfer of this modified DRAM block to the block device utilizing the DMA engine on the controller hardware.

The block device driver may be interrupted on completion of the write transaction, at which point it checks the block device controller hardware registers for status information. If the write transaction completed successfully, the call back function registered by the upper layer is executed and number of bytes transferred are returned. If the write transaction failed an error code is returned.

Figure 6:
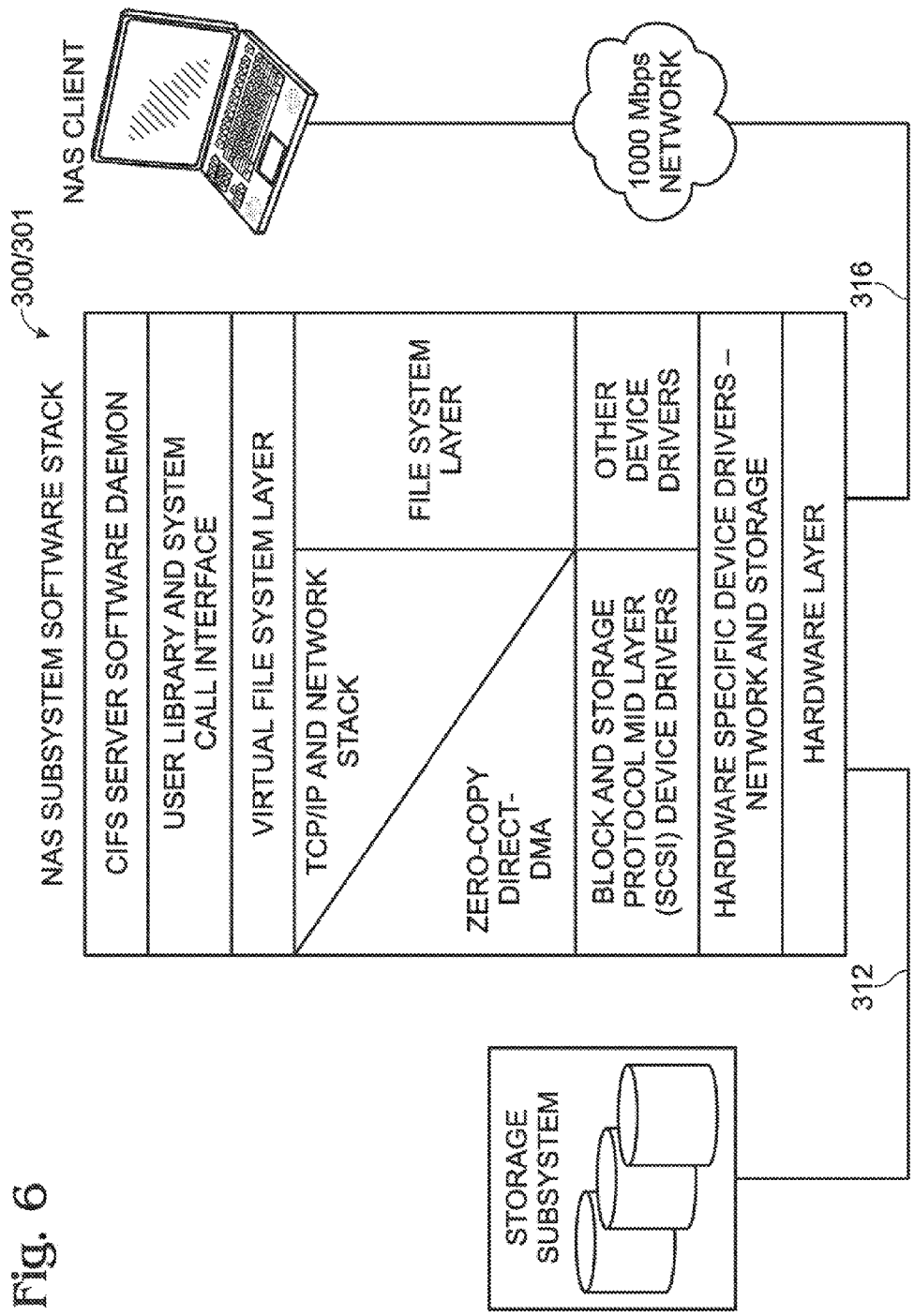
FIG. 6 depicts the architectural placement of the NAS zero-copy Direct DMA software logic of FIGS. 3, 4A and 4B.

FIG. 6 depicts the architectural placement of the NAS zero-copy Direct DMA software logic of FIGS. 3, 4A, and 4B. The NAS zero-copy direct DMA software logic acts as an interface between the TCP layer, the file system layer, and the storage block device layer. It serves to optimize the write data transfer from the TCP stack to the block based file system in a NAS storage device. The zero-copy direct DMA software logic is a part of the CIFS server software operating system stack which runs on the NAS subsystem.

The zero-copy direct DMA is a piece of software. The zero-copy part refers to the portion of the TCP segment file data that is directly read from operating system kernel space without having to go through user-to-kernel copies/transitions. The direct-DMA part refers to the software leveraging from the hardware DMA engine that resides on the block device storage controller hardware. The software basically uses the hardware DMA engine resident on the block device storage controller to perform data transfer. However, in order to transfer data, the zero-copy direct DMA software uses the block driver interface. The block driver, in turn, uses the DMA engine on the block storage device controller to transfer data.

Figure 7:
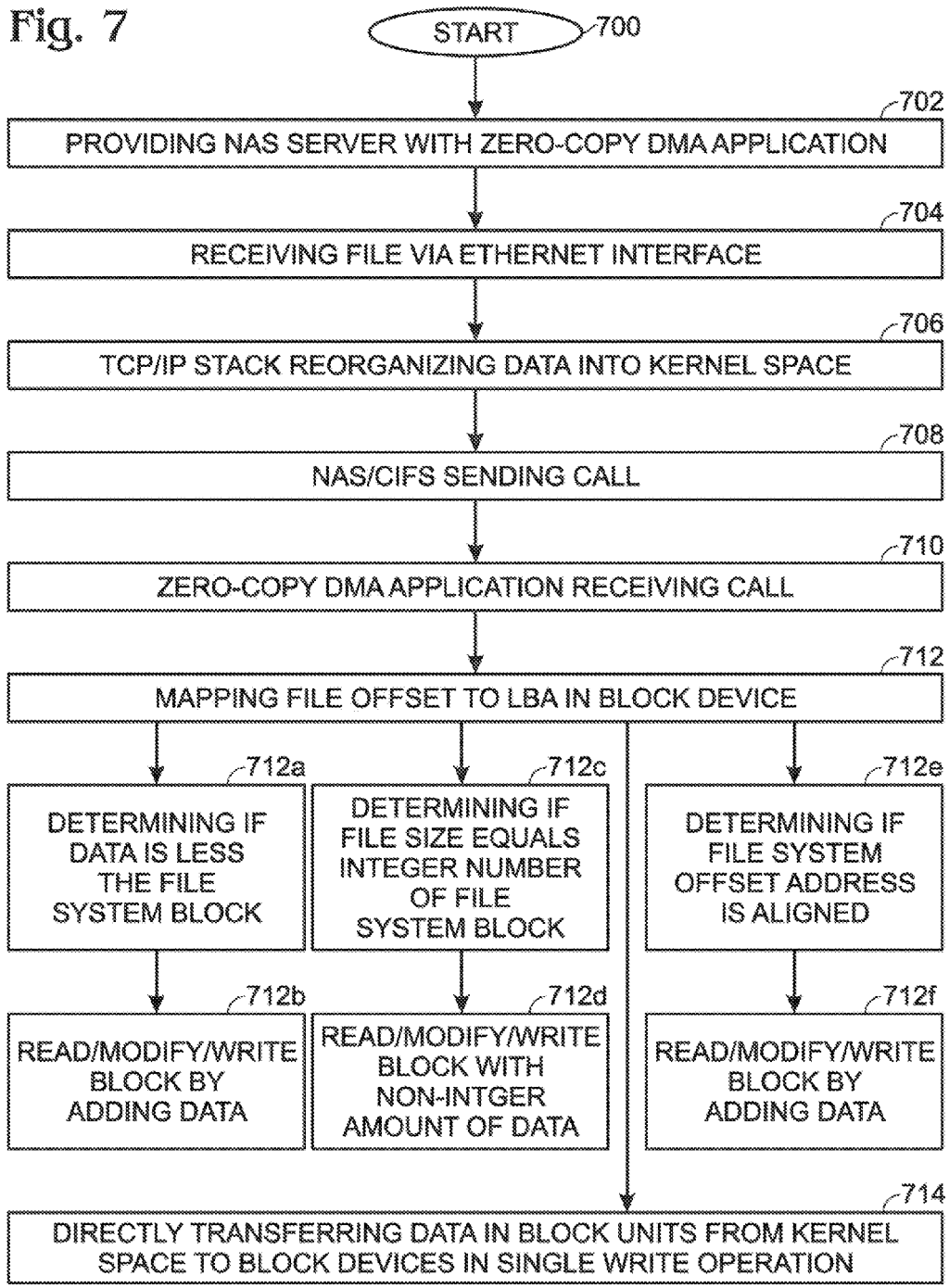
FIG. 7 is a flowchart illustrating a method for a NAS server to directly write data to a storage subsystem.

FIG. 7 is a flowchart illustrating a method for a NAS server to directly write data to a disk or block device within a storage subsystem. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 700.

Step 702 provides a NAS server with a processor, a system random access memory (RAM) with a user space and a kernel space, a Transmission Control Protocol/Internet Protocol (TCP/IP) stack application embedded in the kernel space as a sequence of software instructions executed by the processor, a zero-copy direct memory access (DMA) application embedded in the kernel space as a sequence of software instructions executed by the processor, a block driver DMA application embedded in the kernel space as a sequence of software instructions executed by the processor, a NAS/Common Internet File System (CIFS) server application embedded in the user space as a sequence of software instructions executed by the processor, and an Ethernet interface.

In Step 704 the Ethernet interface receives a file, with a request to the NAS/CIFS server application that the file be written into a block device, and writes the file data into system RAM kernel space as a plurality of decapsulated PDUs. In Step 706 the TCP/IP stack application maps (logically reorganizes) the file data in system RAM kernel space as sequential TCP segments. In Step 708 the NAS/CIFS server application sends a call specifying file storage data. In Step 710 the zero-copy DMA application receives the call. In Step 712 the zero-copy DMA application maps a file offset to a Logical Block Address (LBA) in the block device, and requests that the block device DMA application transfer the file data. Without rewriting the file data in system RAM kernel space, the block driver DMA application transfers the file data in Step 714, in units of file system blocks, directly from kernel space RAM to the block device, with each file system block written in a single write operation.

In one aspect, the NAS/CIFS server application sending the call in Step 708 includes the call specifying information such as a TCP socket descriptor from which the file, in the form of TCP segments, is to be read, the file system descriptor to which the file is to be written, the file offset, and number of bytes in the file, file system flags, and combinations of the above-listed information.

In another aspect, the TCP/IP stack application mapping the file data into the kernel space RAM as a plurality of TCP segments in Step 706 includes the TCP/IP stack application using a first set of pointers to arrange the file data, in the form of decapsulated PDUs, as TCP segments in sequential order. Then, the zero-copy DMA application mapping the LBA in the block device in Step 712 includes using a second set of pointers to arrange the file data in file system blocks. For example, Step 712 may create a scatter-gather list of source addresses in system RAM kernel space for contiguous TCP segments, and corresponding block addresses in the block device.

In one aspect, Step 702 provides an Ethernet first-in first-out (FIFO) memory. In Step 704 the Ethernet interface receives the file data as a plurality of Protocol Data Units (PDUs), circulates the PDUs through the FIFO, and supplies the decapsulated PDUs to system RAM in kernel space. In Step 706 the TCP/IP stack application maps the file data in kernel space system RAM as the plurality of sequential TCP segments.

In another aspect, the zero-copy DMA application mapping the file offset to the LBA in the storage subsystem includes substeps. Step 712a determines if the amount of file data in the plurality of TCP segments is less than a file system block. If the amount of file data is a file system block, the zero-copy DMA application maps the file offset to the LBA in the block device, and proceeds to Step 714. If the amount of file data is less a file system block, the zero-copy DMA application in Step 712b reads a first block into kernel space system RAM from the block device, modifies the first block in system RAM kernel space by adding the file data, and writes the modified first block into the block device from system RAM kernel space.

In another aspect, Step 712c determines if the amount of file data in the plurality of TCP segments has a size equal to an integer number of file system blocks. If the amount of file data includes an integer number of file system blocks, the zero-copy DMA application maps the file offset to the LBA in the block device. If the amount of file data includes is a non-integer number of file system blocks, the zero-copy DMA application in Step 712d reads a first block into kernel space system RAM from the block device, modifies the first block in system RAM kernel space by adding the non-integer amount of file data, and writes the modified first block into the block device from system RAM kernel space.

In one other aspect, Step 712e determines if a destination file system offset address is aligned with an integer number of file system blocks. If the destination file system offset address is aligned with an integer number of file system blocks, the zero-copy DMA application maps the file offset to the LBA in the block device. If the destination file system offset address is not aligned with an integer number of file system blocks, the zero-copy DMA application in Step 712f reads at least a first block into system RAM kernel space from the block device, modifies the first block in system RAM kernel space by adding the file data, and writes the modified first block into the block device from system RAM kernel space.

A system and method have been provided for directly writing data to a disk or block device within a NAS subsystem. Examples of particular message structures, software modules, and process flows have been presented to illustrate the invention. However, the invention is not limited to merely these examples. Other variations and embodiments of the invention will occur to those skilled in the art.

We claim:

1. A method for directly writing data to a disk or block device within a storage subsystem, the method comprising:
   receiving a file at an Ethernet interface;
   receiving a request at a network attached server/Common Internet File System (NAS/CIFS) server application embedded in a system random access memory (RAM) user space that the file be written to a block device;
   writing, by the Ethernet interface, the file to one or more locations in a system RAM kernel space as a plurality of Protocol Data Units (PDUs);
   mapping, by a Transmission Control Protocol/Internet Protocol (TCP/IP) stack application embedded in the system RAM kernel space, file data comprising the file to the system RAM kernel space as sequentially ordered TCP segments;
   sending, by the NAS/CIFS server application, a call specifying file storage data;
   receiving the call at a zero-copy direct memory access (DMA) application embedded in the system RAM kernel space;
   mapping, by the zero copy DMA application, a file offset to a Logical Block Address (LBA) in the block device, and requesting that the block driver DMA application transfer the file data; and
   without rewriting the file data in the system RAM kernel space, transferring the file data in units of file system blocks, by a block driver DMA application embedded in the system RAM kernel space, directly from the one or more locations in the system RAM kernel space to the block device, wherein the file system blocks are respectively written in a single write operation.

2. The method of claim 1, wherein the sending the call comprises specifying at least one of a TCP socket descriptor from which the TCP segments are to be read, a file system descriptor to which the file is to be written, the file offset, a number of bytes in the file, or one or more file system flags.

3. The method of claim 1, wherein the mapping the file data into system RAM kernel space comprises using a first set of pointers to arrange decapsulated PDUs comprising the file data as TCP segments in sequential order; and
wherein the mapping the file offset to the LBA in the block device comprises using a second set of pointers to arrange the file data in the units of file system blocks.

4. The method of claim 3, wherein the mapping the file offset to the LBA in the block device comprises creating a scatter-gather file that identifies at least one source address in the system RAM kernel space for contiguous TCP segments and at least one corresponding block address in the block device.

5. The method of claim 1, wherein the receiving the file comprises:
receiving the file data as the plurality of PDUs,
circulating the plurality of PDUs through a first-in-first-out (FIFO) memory; and
supplying the plurality of PDUs to the system RAM kernel space;
wherein the mapping the file data to the system RAM kernel space comprises mapping the file data to the system RAM kernel space as the sequentially ordered TCP segments.

6. The method of claim 1, wherein the mapping the file offset to the LBA in the block device comprises:
mapping the file offset to the LBA in the block device in response to a determination that an amount of file data in the sequentially ordered TCP segments is equal to a file system block; and
in response to a determination that the amount of the file data is less than the file system block:
reading a first block into the system RAM kernel space from the block device;
modifying the first block in the system RAM kernel space by adding the file data to yield a modified first block; and
writing the modified first block to the block device from the system RAM kernel space.

7. The method of claim 1, wherein the mapping the file offset to the LBA in the block device comprises:
mapping the file offset to the LBA in the block device in response to a determination that an amount of the file data includes an integer number of file system blocks; and
in response to a determination that the amount of the file data comprises a non-integer number of file system blocks:
reading a first block into the system RAM kernel space from the block device;
modifying the first block in the system RAM kernel space by adding the non-integer number of file system blocks to yield a modified first block; and
writing the modified first block to the block device from the system RAM kernel space.

8. The method of claim 1, wherein the mapping the file offset to the LBA in the block device comprises:
mapping the file offset to the LBA in the block device in response to a determination that a destination file system offset address is aligned with an integer number of file system blocks; and
in response to a determination that the destination file system offset address is not aligned with an integer number of file system blocks:
reading a first block into the system RAM kernel space from the block device;
modifying the first block in the system RAM kernel space by adding the file data to yield a modified first block; and
writing the modified first block to the block device from the system RAM kernel space.

9. A system for directly writing data to a disk or block device within a storage subsystem, the system comprising:
a processor;
a system random access memory (RAM) comprising a user space and a kernel space;
an Ethernet interface configured to receive a file and a request to an NAS server that the file be written to a block device, and write the file to one or more locations in the kernel space as a plurality of Protocol Data Units (PDUs);
a Transmission Control Protocol/Internet Protocol (TCP/IP) stack application embedded in the kernel space as a sequence of software instructions executed by the processor, the TCP/IP stack application configured to map file data comprising the file in the kernel space as sequentially ordered TCP segments;
a network-attached storage/Common Internet File System (NAS/CIFS) server application configured to send a call specifying file storage data;
a zero-copy direct memory access (DMA) application embedded in the kernel space, the zero-copy DMA application configured to receive the call, map a file offset to a Logical Block Address (LBA) in the block device, and initiate a request to block device transfer the file data; and
a block driver DMA application embedded in the kernel space, the block driver DMA application configured to transfer the file data in units of file system blocks directly from the one or more locations in the kernel space to the block device without rewriting the file data in the kernel space, wherein the file system blocks are respectively written in a single write operation.

10. The system of claim 9, wherein the NAS/CIFS server application is further configured to send the call specifying at least one of a TCP socket descriptor from which at least one TCP segment comprising the file is to be read, a file system descriptor to which the file is to be written, the file offset, a number of bytes in the file, or one or more file system flags.

11. The system of claim 9, wherein the TCP/IP stack application is further configured to use a first set of pointers to arrange the file data as the sequentially ordered TCP segments; and
wherein the zero-copy DMA application is further configured to use a second set of pointers to map the file offset to destination LBAs.

12. The system of claim 11, wherein the zero-copy DMA application is further configured to create a scatter-gather file that identifies at least one source address in the kernel space for contiguous TCP segments and at least one corresponding block address in the block device.

13. The system of claim 9, further comprising:
an Ethernet first-in first-out (FIFO) memory,
wherein the Ethernet interface is further configured to receive the file data as the plurality of PDUs, circulate the plurality of PDUs through the FIFO to yield decapsulated PDUs, and supply the decapsulated PDUs to the kernel space, and wherein the TCP/IP stack application is further configured to map the file data in the kernel space as the sequentially ordered TCP segments.

14. The system of claim 9, wherein the zero-copy DMA application is further configured to:
   map the file offset to the LBA in the block device in response to a determination that an amount of the file data in the sequentially ordered TCP segments is equal to a file system block, and
   in response to a determination that the amount of the file data in the sequentially ordered TCP segments is less than a file system block:
      read a first block into the kernel space from the block device,
      modify the first block in the kernel space by adding the file data to yield a modified first block, and
      write the modified first block into the block device from the kernel space.

15. The system of claim 9, wherein the zero-copy DMA application is further configured to:
   map the file offset to the LBA in the block device in response to a determination that an amount of the file data in the sequentially ordered TCP segments comprises an integer number of file system blocks, and
   in response to a determination that the amount of the file data comprises a non-integer number of file system blocks less than the integer number of file system blocks
      read a first block into the kernel space from the block device,
      modify the first block in the kernel space by adding the file system blocks comprising the non-integer number to yield a modified first block, and
      write the modified first block into the block device from the kernel space.

16. The system of claim 9, wherein the zero-copy DMA application is further configured to:
   map the file offset to the LBA in the block device in response to a determination that a destination file system offset address is aligned with an integer number of file system blocks, and
   in response to a determination that the destination file system offset address is not aligned with the integer number of file system blocks:
      read at least a first block into the kernel space from the block device,
      modify the first block in the kernel space by adding the file data to yield a modified first block, and
      write the modified first block to the block device from the kernel space.

17. The system of claim 9, wherein the block device comprises an interface and an embedded direct memory access (DMA) engine.

18. A network-attached storage (NAS) server for directly writing data to a disk or a block device within a storage subsystem, the NAS server comprising a processor and a system random access memory (RAM), the NAS server executing the following acts:
   receiving an Ethernet protocol file and a request that the file be written to the block device;
   writing file data comprising the file to one or more locations in the system RAM kernel space as a plurality of Protocol Data Units (PDUs);
   mapping the plurality of PDUs in the system RAM kernel space as sequentially ordered Transmission Control Protocol (TCP) segments;
   sending a call specifying file storage data;
   mapping a file offset to a Logical Block Address (LBA) in the block device and requesting a transfer of the file data to a storage subsystem; and
   transferring the file data, in units of file system blocks, directly from the one or more locations in the system RAM kernel space to the block device without rewriting the file data in the system RAM kernel space, wherein the file system blocks are respectively written in a single write operation.

* * * * *